US012722508B2

(12) United States Patent
Marcos Moreira Da Silva et al.

(10) Patent No.: US 12,722,508 B2
(45) Date of Patent: Sep. 1, 2026

(54) CHARGING CABLE MANAGEMENT SYSTEM

(71) Applicant: I-CHARGING—MOBILIDADE ELÉTRICA, SA, Oporto (PT)

(72) Inventors: Pedro Nuno Marcos Moreira Da Silva, Oporto (PT); Vitor Alexandre Martins Ferreira, Guimarães (PT); Germano Miguel Oliveira Da Silva, Santo Tirso (PT); Susana Marinho Ferreira Guedes, Maia (PT); Bruno Filipe Alves De Oliveira, Cavalões (PT); Nelson Neves Da Rocha, Maia (PT); Filipe Alexandre Silva Ferreira, Alvarelhos (PT)

(73) Assignee: I-CHARGING—MOBILIDADE ELÉTRICA, SA, Oporto (PT)

( * ) Notice: Subject to any disclaimer, the term of this patent is extended or adjusted under 35 U.S.C. 154(b) by 650 days.

(21) Appl. No.: 18/271,211

(22) PCT Filed: Jan. 7, 2022

(86) PCT No.: PCT/IB2022/050116
§ 371 (c)(1),
(2) Date: Jul. 6, 2023

(87) PCT Pub. No.: WO2022/149096
PCT Pub. Date: Jul. 14, 2022

(65) Prior Publication Data

US 2024/0067010 A1 Feb. 29, 2024

(30) Foreign Application Priority Data

Jan. 7, 2021 (PT) ........................................ 116993

(51) Int. Cl.
*B60L 53/18* (2019.01)
*B60L 53/31* (2019.01)
*H02G 11/02* (2006.01)

(52) U.S. Cl.
CPC ............... *B60L 53/18* (2019.02); *B60L 53/31* (2019.02); *H02G 11/02* (2013.01)

(58) Field of Classification Search
CPC .......... B60L 53/18; B60L 53/31; H02G 11/02
(Continued)

(56) References Cited

U.S. PATENT DOCUMENTS 11,260,767 B2 3/2022 Mailloux
2012/0048983 A1 3/2012 Bianco et al.
(Continued)

FOREIGN PATENT DOCUMENTS

CN 207243452 U 4/2018
CN 108544953 A 9/2018
(Continued)

OTHER PUBLICATIONS

PCT International Search Report for International Application No. PCT/IB2022/050116, mailed May 6, 2022, 5pp.
(Continued)

*Primary Examiner* — Daniel A Hess
(74) *Attorney, Agent, or Firm* — The Roy Gross Law Firm, LLC; Roy D. Gross

(57) ABSTRACT

The present invention concerns a charging cable management system, which is motorized and is applied in electric vehicle charging equipment, or other applications that require this type of solution. The developed charging cable management system allows extending or retracting a suspension cable that assists the user in the task of mobilizing and moving an electric charging cable for charging electric vehicles, preventing it from touching the ground when not in
(Continued)

use. In addition, the charging cable management system allows the use and mobilization of charging cables with greater longitudinal amplitude, minimizing the efforts associated with carrying out these tasks by the user.

13 Claims, 6 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 2014/0048638 | A1* | 2/2014 | Falk | B65H 75/4421 242/390.8 |
| 2024/0059166 | A1* | 2/2024 | Hall | B60L 53/30 |

FOREIGN PATENT DOCUMENTS

| | | | |
|---|---|---|---|
| CN | 209113468 | U | 7/2019 |
| CN | 111016704 | A | 4/2020 |
| EP | 3412497 | A1 | 12/2018 |
| EP | 3441256 | A1 | 2/2019 |
| KR | 20190062099 | A | 6/2019 |
| KR | 102099759 | B1 | 4/2020 |

OTHER PUBLICATIONS

PCT Written Opinion for International Application No. PCT/IB2022/050116, mailed May 6, 2022, 7pp.

PCT International Preliminary Report on Patentability for International Application No. PCT/IB2022/050116, issued Jul. 4, 2023, 8pp.

* cited by examiner

CHARGING CABLE MANAGEMENT SYSTEM

CROSS REFERENCE TO RELATED APPLICATIONS

This application is a National Phase of PCT Patent Application No. PCT/IB2022/050116 having International filing date of Jan. 7, 2022, which claims the benefit of priority of Portugese Patent Application No. 116993, filed Jan. 7, 2021, the contents of which are all incorporated herein by reference in their entirety.

TECHNICAL DOMAIN

The present invention concerns a charging cable management system, which is motorized and is applied in electric vehicle charging equipment, or other applications that require this type of solution.

BACKGROUND

With the increase of electric vehicles on the market, the demand for the solution in terms of technology and user experience increases. Technological solutions are constantly evolving. However, there are still gaps in terms of the charging experience offered to the user, such as handling charging cables.

With the increase in the number and variety of electric vehicle models available on the market, where the physical charging ports (i.e. sockets) are located in completely different locations from model to model, the need to guarantee charging independently of the vehicle or model becomes evident. Thus, it is necessary to ensure the availability of longer cables at charging stations when compared to solutions initially developed and launched on the market.

In addition to the issue of the charging socket arrangement in electric vehicles, the charging points themselves, where user interfaces are installed, are increasingly varied. Thus, it is relevant that charger manufacturers ensure that charging stations always have a cable long enough to reach vehicles.

The solution presented by the present invention allows the user charging interface to provide a unique charging experience, as no force will be required to handle and hold the charging cable. In order to carry out the charging operation, the charging cable management system of the present invention will provide more charging cable according to the need, as well as proceed with the collection thereof, requiring no effort on the part of the user.

U.S. Pat. No. 6,338,450B1 describes a cable manager having a support member and a bracket that mounts the support member to a ceiling joist of a golf cart shed. The first pulley wheel attaches to the top end of the support member, and a second pulley wheel attaches to a pulley mounting bracket. A coil spring entrained about the first pulley wheel has one end attached to the pulley mounting bracket and the other end attached to the bottom end of the support member. The second pulley wheel is suspended at a lower elevation than the first pulley wheel and moves down against the force of the spring when the power cable entrained over it is pulled down to connect to a golf cart for recharging. While recharging occurs, the lower pulley is fixed to the support member by attaching its bracket to an S-hook that attaches the spring to the vertical support member. When the power cable is released, the pulley moves up but its upward travel is limited by a cable bracket that captures the power cable and holds it in position for easy retrieval for the next use.

Korean Patent KR 2019 0062099 A from INWOO SYSTEM CO LTD, published on 5 Jun. 2019, discloses a device for controlling an electric car charging cable and a canopy for an electric car charger including a waiting booth. The invention prevents a charging cable from sagging when charging an electric car, wherein the charging cable connects a power supply unit to a charging gun connected to a socket part provided on the electric car; and allows a user to rest and monitor the charging status in a separate space while charging the electric car with the electric energy. In particular, the canopy for an electric car charger comprises: a canopy installed on a ground surface; a power supply unit installed inside the canopy to supply electricity charging an electric car battery; a charging cable for receiving electric energy from the power supply unit to supply the electric energy to the electric car; and a suspension means capable of elastically pulling the charging cable from a suspended state while charging, and capable of pulling the pulled charging cable back to its original position to be suspended upon completion of charging.

Chinese Utility Model CN 209 113 468 U from ANHUI ZHONGSHENG SMART TECH CO LTD, published on 16 Jul. 2019, discloses a kind of electric expansion oil filling pipes, including a rectangular box, a pull breaking valve, a rope pulling device and an oil pipe. The Pull breaking valve is set to the rectangular box inner bottom surface, the rope pulling device is set to the rectangular box inner top surface, and the rope pulling device is equipped with a speed regulating motor for driving the rope pulling device to rotate, the rope pulling device passes through the rope thereunder and is connected with an anti-clamp. One end of the oil pipe is connected to the pull breaking valve, and the other end passes through the anti-clamp and stretches out outside the rectangular box from the conduit through bore to be connected to a filling gun. This invention solves the problem in that the rectangular box is forgotten and oil liquid outflows when the oil pipe is pulled energetically.

Chinese Utility Model CN 207 243 452 U from BEIJING CHANGGI SERVICE STATION EQUIPMENT CO LTD, published on 17 Apr. 2018, discloses a motor-driven fuel charger sebific duct distributor, wherein one end is removably arranged on the drawstring on the refueling line, and the other end winding of the drawstring is arranged on the bull wheel of hoist engine, and including a motor arranged on the top of the fuel charger, and the drive shaft of the motor and the wheel shaft of the bull wheel are coaxially disposed, an electric machine controller for driving the motor forward or reverse, fuel charger switches communicating with the electric machine controller and connections. The utility model also provides a motor-driven fuel charger sebific duct distributor, which can be connected by the switch with the fuel charger, and the flexible operation refueling line is automatically put down or hung up, effectively preventing the refueling line from falling and be rolled on the ground by the vehicle.

SUMMARY

The present application describes an electric vehicle charging cable management system comprising a motorized winding system for a suspension cable, wherein the motorized winding system is adapted to control the provision of the suspension cable that guarantees the support and suspension of the electric vehicle charging cable.

In a proposed embodiment, the motorized winding system comprises a longitudinal U-shaped rail with two ends, inside which a guide runs longitudinally comprising a vertical hole passing through its central core and which is physically and mechanically adapted to the shape of the rail allowing its free movement between the two ends of the rail, wherein the base of said rail comprises a longitudinal cutout coincident with the positioning and alignment of the vertical hole of the guide, the rail comprising at one of its ends a first offset sensor, and at the opposite end a second offset sensor; a U-shaped bracket comprising a threaded shaft, a motor, limit switch sensors A and B, the threaded shaft mechanically adapted to the bracket comprises a movable guide, the motor mechanically adapted to the threaded shaft in order to promote its rotation is fixed to the bracket, the limit switch sensors A and B fixed to the bracket are positioned in order to determine the positioning of the movable guide, and the rail being fixed to said bracket; a reel, positioned above the rail and mechanically adapted to the threaded shaft in order to accompany its rotational motions, comprising a mechanical fastening means; and a suspension cable fixed at one of its ends to the reel by said mechanical fastening means, simultaneously passes through the longitudinal cutout of the gutter and the guide hole comprises at its other end a suspension cable bracket mechanically fixed by a clamping system.

In another proposed embodiment, the motor is mechanically adapted to the threaded shaft by means of a rotor.

In another proposed embodiment, the first and second offset sensors detect the contact of the guide with the respective end of the rail, promoting the actuation of the motor.

In yet another embodiment, the contact of the guide with the first offset sensor promotes the rotation of the motor in one direction, and the contact of the guide with the second offset sensor promotes the rotation of the motor in the same direction corresponding to the unwinding of the suspension cable.

In yet another embodiment, the limit switch sensors A and B detect the contact of the movable guide running along the threaded shaft with the ends of the bracket.

In yet another embodiment, the reel promotes the winding or unwinding of the suspension cable through the action generated by the motor.

In yet another embodiment, the contact of the movable guide with the limit switch sensor A or the limit switch sensor B identifies the winding or unwinding position of the cable on the reel.

In yet another embodiment, the proposed system comprises an outer housing with an open groove in its base that allows the suspension cable to pass through and be handled.

In yet another embodiment, the proposed charging cable management system comprises a control system consisting of a signal acquisition and processing unit, a processing and control unit and an output signal for motor control; a control system; and a DC power supply.

In yet another embodiment, the proposed system comprises a sensor system composed of motor current sensors and connector rest sensors.

In yet another embodiment, the control system receives the signals from the sensor system through the signal acquisition unit, performing the signal processing in the processing unit which sends the output signal to the motor control system.

In yet another embodiment, the output signal actuates the control system through the use of an H-bridge, which promotes the rotation of the motor in one direction, closing a MOSFET Q3-Q2 circuit, or promotes the rotation of the motor in the opposite direction closing a MOSFET Q1-Q4 circuit.

The present document further describes an electric vehicle charging system characterized in that it comprises at least one previously described electric vehicle charging cable management system, and at least one charging cable with a charging connector; wherein the charging cable is supported by the suspension cable of the motorized winding system ensuring that it does not come into contact with the ground when not in use.

The proposed system could also be implemented in fuel supply pumps or other types of hose bracket.

BRIEF DESCRIPTION

The present invention concerns a cable management system, in particular cables for charging electric vehicles, using a motorized system.

The present solution is intended for application in electric vehicle charging stations, when there is a need to use longer charging cables and can additionally serve as a solution for any other type of application requiring this type of innovation.

The objective of the present charging cable management system is to improve the handling of the charging cable of electric vehicle charging stations, minimizing the efforts by the user, also guaranteeing the integrity and durability of said charging cable once that it does not come into contact with the ground. At present, for any charging station to guarantee the availability of longer charging cables that allow reaching farther positions of the input connector in the vehicle, these are often in contact with the ground at least at a point along their entire length when not are in use and at rest, so such use of the charging cable promotes wear and tear thereof, reducing its useful life, and jeopardizing the safety of the user.

There are a few solutions available to try to mitigate this issue. However, most of these solutions have weaknesses in their operating concept. Solutions based on spring or elastic, as well as solutions based on gravity systems, are the most significant examples of solutions presented on the market.

In spring or elastic solutions, the tensioning strength increases proportionally with the distance from the charging station, so the user will experience resistance to the extension of the suspension cable, making movement difficult and uncomfortable. The strength required to carry out the carrying operation of the charging cable to the final charging position of the vehicle becomes, therefore, strong and demanding until the user obtains the maximum extension. Gravity-based restraint systems use counterweights to apply a constant force, but the accelerating retraction process implies that the user may have a bad experience.

The present solution uses a motorized charging cable management system, which prevents the electric charging cable from contacting or resting on the ground. The system is also different in that it does not wind the electric charging cable, but rather an auxiliary cable for suspending the electric charging cable. The motorized system features controlled strength and speed.

So, when pulling the charging cable towards the vehicle, the system bracket that holds it, promotes its release in a controlled way until no more charging cable is needed. When the user finishes the charging session and removes the connector from the vehicle, he places it in the resting position of the charging station, and the system automatically retracts the charging cable, requiring no intervention by the user.

The present application therefore describes a system for tensioning and retracting electric vehicle charging cables, comprising:

power supply;
motor;
command system;
overcurrent protection;
control system;
limit switch sensors;
reel;
suspension cable with guide.

According to the present invention, when the user lifts the connector from the charging station bracket and leads it towards the vehicle, the cable tensioning and retraction system identifies that the connector is no longer at rest and starts evaluating the need to supply a charging cable to the user. As soon as, using the sensors, the system detects the angular movement of the charging cable, the motor is activated acting on the reel where the support cable is wound, which promotes the unwinding of the suspension cable. The system motor is immobilized as soon as it is no longer necessary to supply more charging cable to the user or upon detection that the suspension cable is fully unwound. As soon as the system detects that the charging cable connector is in the charging station's rest bracket, and after a short waiting time, the motor is actuated, this time in the retraction direction of the suspension cable until the entire charging cable is collected. When the suspension cable is detected to be fully retracted, the motor is immobilized, and the system enters idle mode.

Whenever the motor releases or retracts the suspension cable, no strength is applied to the charging cable by the user, unlike traditional solutions. The motor controls the speed of both movements, ensuring user comfort.

BRIEF DESCRIPTION OF THE DRAWINGS

For an easier understanding of the present application, figures are herein attached, which represent embodiments which however are not intended to limit the art herein disclosed.

303—counterclockwise rotation movement;

1014—DC motor.

Figure 12:
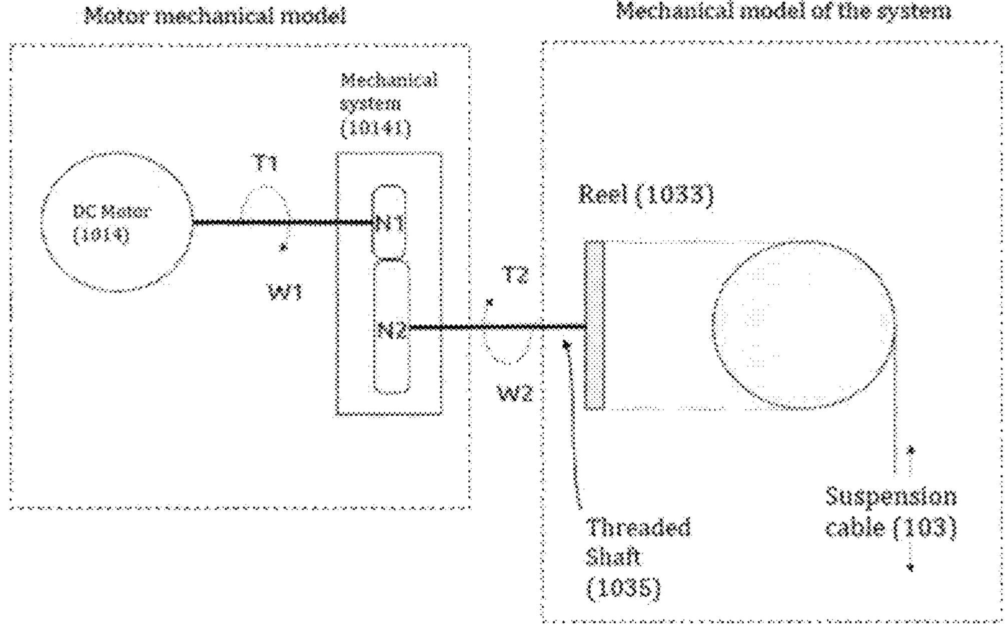

FIG. 12 depicts the mechanical component, wherein:

103—suspension cable;

1014—DC motor;

10141—mechanical system, rotor;

1035—threaded shaft;

1033—reel.

Figure 13:
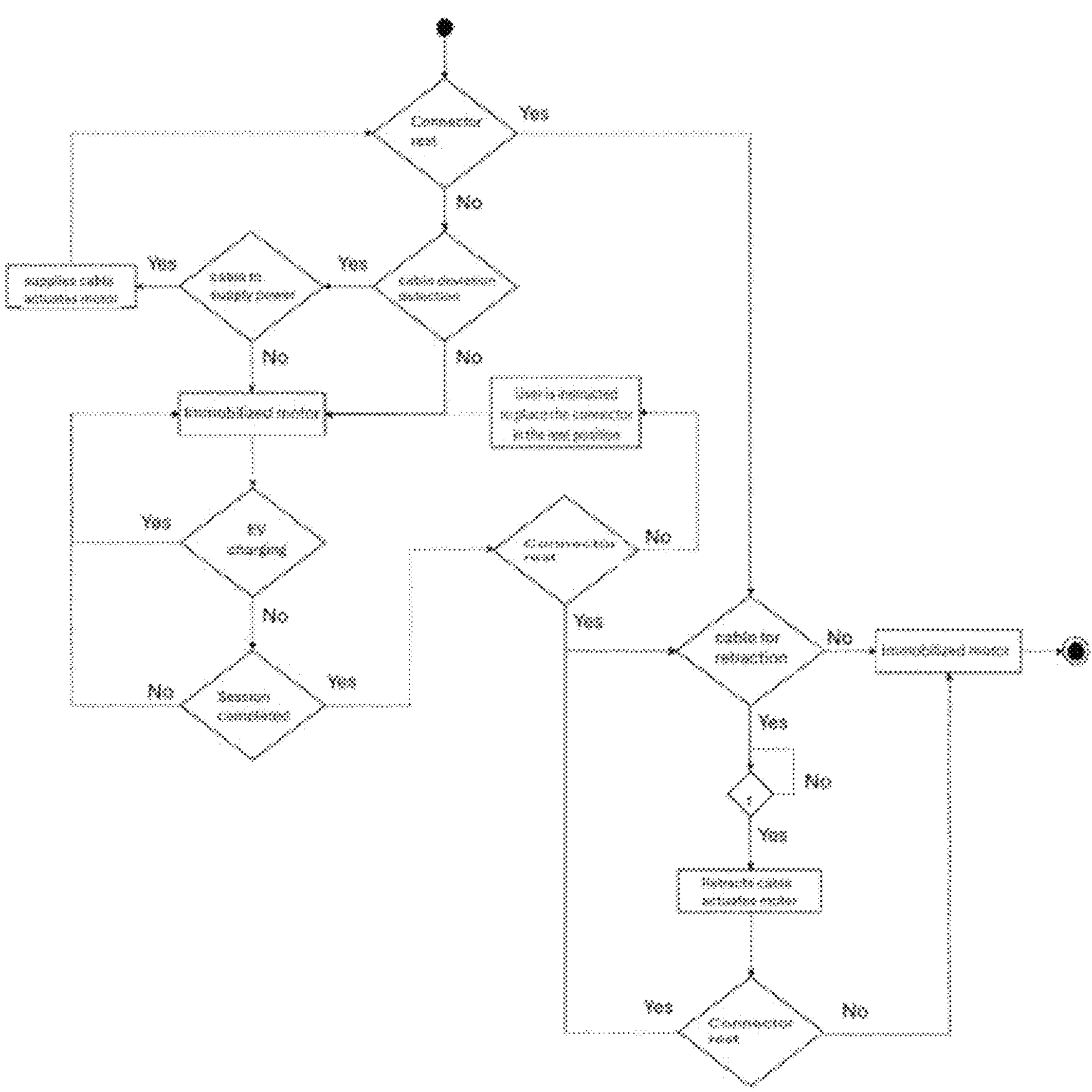

FIG. 13 depicts the diagram of the charging cable management system states, describing its method of operation.

DESCRIPTION OF EMBODIMENTS

Referring to the figures, some embodiments are now described in more detail, which are not intended, however, to limit the scope of the present application.

Figure 1:
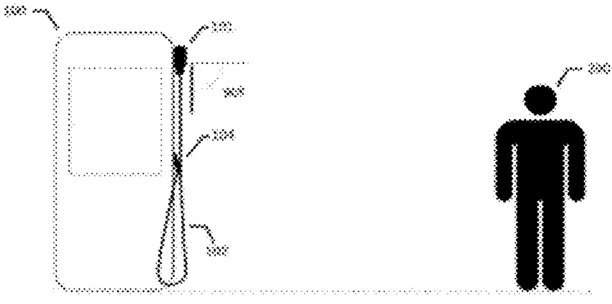
FIG. 1 shows an electric vehicle charging system wherein:
100—charging station;
101—motorized winding system;
102—charging cable;
104—charging connector;
200—user.

With reference to FIG. 1, the charging connector (104) is inactive and placed in the rest bracket of the charging station (100), causing the charging cable (102) to be retracted and the cable suspension (103) completely wound onto the reel (1033) of the motorized winding system (101).

In this case, there is no tension or offset in the suspension cable (103) to activate the charging cable management system.

Figure 2:
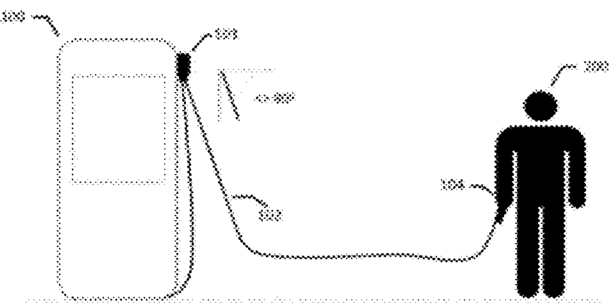
FIG. 2 shows an electric vehicle charging system wherein:
100—charging station;
101—motorized winding system;
102—charging cable;
104—charging connector;
200—user.

In FIG. 2, the first interaction of the user (200) with the charging station (100) is depicted. Here, the user (200) pulls the charging connector (104) towards the electric vehicle, the charging cable (102) being suspended in the air without coming into contact with the ground.

At this first moment, through the first and second offset detectors (1034, 1039), the motorized winding system (101) detects that more charging cable (102) is being requested by the user (200).

Figure 3:
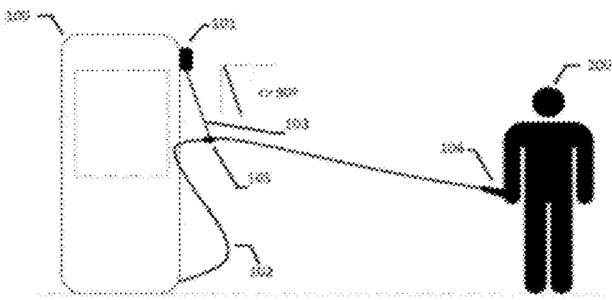
FIG. 3 shows an electric vehicle charging system wherein:
100—charging station;
101—motorized winding system;
102—charging cable;
103—suspension cable;
104—charging connector;
105—suspension cable bracket;
200—user.

In FIG. 3, the suspension cable (103) is responsible for guaranteeing the lift and support of the charging cable (102), preventing it from coming into contact with the ground when the user (200) moves the charging connector (104) towards the vehicle to be loaded. In this case, as long as offset detection is made by first and second offset detectors (1034, 1039), the motorized winding system (101) will unwind the suspension cable (103) from the reel (1033).

Figure 4:
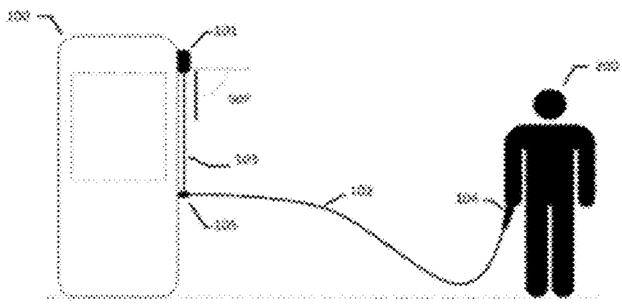
FIG. 4 schematically shows an electric vehicle charging system wherein:
100—charging station;
101—motorized winding system;
102—charging cable;
103—suspension cable;
104—charging connector;
105—suspension cable bracket;
200—user.

In FIG. 4, the motorized winding system detects (101), through the first and second offset detectors (1034, 1039), that no more charging cable (102) is being requested, and since the suspension cable (103) is vertical to the charging station (100), first and second offset sensors (1034, 1039) will not activate. Thus, the motor (1014) is immobilized, and the suspension cable bracket (105) is responsible for guaranteeing the lift of the charging cable (102), allowing sufficient slack and tension for the user (200) to guarantee the insertion of the charging connector (104) in the vehicle.

Figure 5:
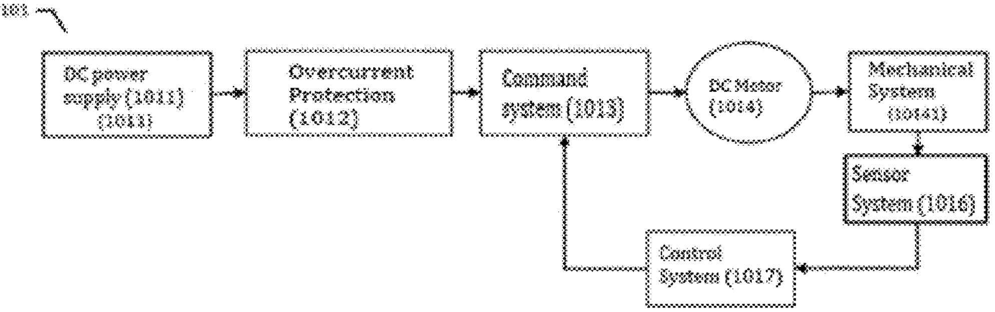
FIG. 5 depicts the block diagram making up the motorized winding system, wherein:
101—motorized winding system;
1011—power supply;
1012—overcurrent protection;
1013—command system;
1014—DC motor;
10141—mechanical system, rotor;
1016—sensor system;
1017—control system.

The charging cable management system solution proposed by the present invention, as shown in FIG. 5, is composed of the motorized winding system (101), which comprises a DC power supply (1011), a command system (1013), control system (1017), overcurrent protection (1012), a DC motor, DC (1014) with gearbox, a mechanical system, rotor (10141) and sensor system (1016).

Figure 6:
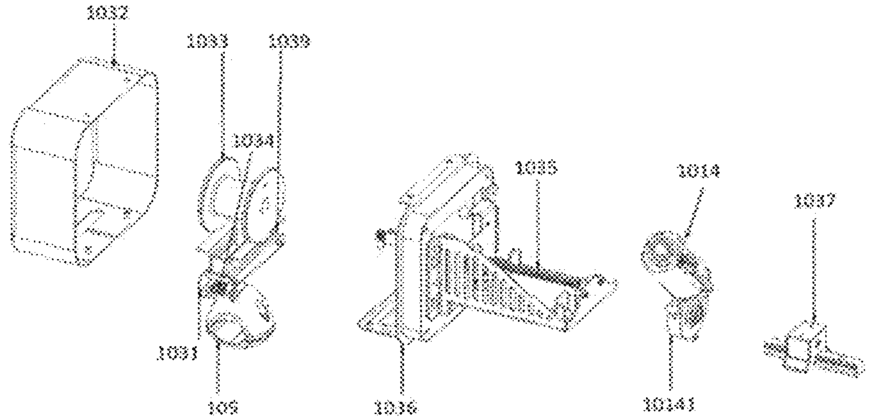
FIG. 6 depicts the mechanical components making up the motorized winding system, wherein:
105—suspension cable bracket;
1014—DC motor;
10141—rotor;
1031—rail;
1032—system housing,
1033—reel;
1034—first offset detector/sensor;
1035—threaded shaft;
1036—bracket;
1037—movable guide;
1039—second offset detector/sensor.

The innovation of the solution proposed by the present invention involves the use of a direct current operating motor (1014) to promote the winding and unwinding of the suspension cable (103) that supports the charging cable (102), allowing the latter to have greater extension and consequent greater reach. The suspension cable (103) supports the charging cable (102) through the suspension cable holder (105) The motor (1014) is mechanically connected to a reel (1033) where the suspension cable (103) is wound and unwound. An exploded view of the motorized winding system (101) developed is shown in FIG. 6.

The motorized winding system (101) allows the application and operation with different types of charging cables (102) such as CCS and CHAdeMO of different diameters and weights, either cooled or not. The proposed motorized winding system (101) has the possibility to change the necessary parameters to compensate for the different charging cables (102) and maintain speed and ease of use regardless of the type of charging cable.

Figure 7:
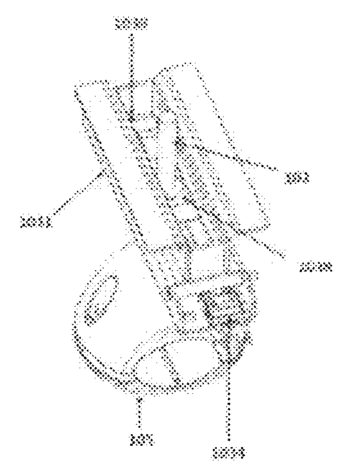
FIG. 7 depicts the mechanical components making up the suspension cable offset detection system, wherein:
103—suspension cable;
105—suspension cable bracket;
1031—rail;
1034—first offset detector/sensor;
1038—suspension cable guide;
1039—second offset detector/sensor.

To ensure that the suspension cable (103) is released only when requested, a mechanism has been developed that determines, through the positioning of said suspension cable (103), whether the user (200) is pulling the electric charging cable (102). FIG. 7 illustrates this suspension cable offset detection mechanism (103).

Figure 8:
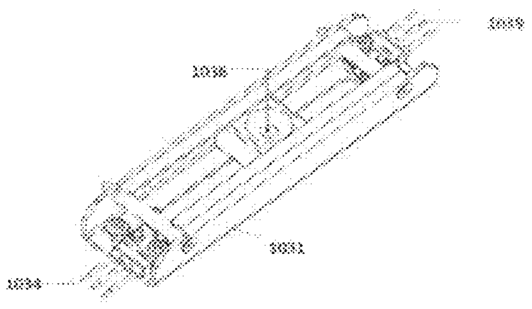
FIG. 8 depicts in detail the mechanical components making up the suspension cable offset detection system, wherein:
1031—rail;
1034—first offset detector/sensor;
1038—suspension cable guide;
1039—second offset detector/sensor.

In that sense, when the user (200) pulls the charging cable (102) towards the vehicle, the suspension cable (103) that crosses the guide (1038) slides in the rail (1031) illustrated in FIG. 7 and FIG. 8. When the guide (1038) touches one of the ends of the rail (1031), the first and second offset detectors (1034, 1039) are activated, causing the control system (1017) and command system (1013) to actuate the motor (1014).

In order to ensure that the suspension cable (103) movement is detected, regardless of where the user (200) is and when pulling the charging cable (102), the groove incorporated in the rail (1031) has been designed in such a way that the suspension cable (103) always slides until one of the first and second offset detectors (1034, 1039) triggers.

Figure 9:
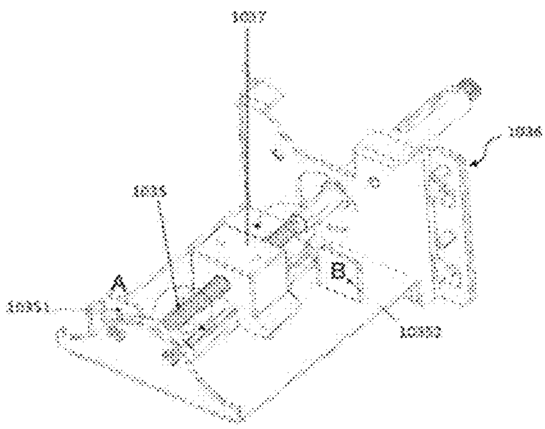
FIG. 9 depicts in detail the mechanical components making up the retracted or extended cable detection system, wherein:
1035—threaded shaft;
1036—bracket;
1037—movable guide;
10351—limit switch detector/sensor A;
10352—limit switch detector/sensor B.

As soon as the first and second offset detectors (1034, 1039) of the rail (1031) are activated by contact with the guide (1038), the motorized winding system (101) validates the status of the limit switch sensors A and B (10351, 10352) installed on the bracket (1036) as shown in FIG. 9.

To ensure that the motor (1014) stops the rotation movement of its axis when the suspension cable (103) is fully unwound, or fully wound, a mechanism has been created that, through a movable guide (1037), which travels a threaded shaft (1035) rotating in synchrony with the motor shaft (1014) through mechanical communication performed by a rotor (10141), causes the movable guide (1037) to abut one of points A or B, as shown in FIG. 9, triggering each of the limit switch sensors A or B (10351, 10352), respectively the limit switch sensors at points A or B (10351, 10352).

If the suspension cable (103) is fully wound, the movable guide (1037) abuts one of the identified points (A or B) and triggers one of the limit switch sensors A or B (10351 or 10352). Likewise, in case the suspension cable (103) is fully unwound, the movable guide (1037) will abut the opposite point (A or B), triggering the other limit switch sensor A or B (10351 or 10352).

In this way, the motorized winding system (101) analyzes the status of the limit switch sensors A and B (10351, 10352) to determine whether the suspension cable (103) is fully wound on the reel (1033) or fully extended on the vertical position to the charging station (100), and together with the two first and second offset sensors (1034, 1039), it validates whether the release of more charging cable (103) is being requested and whether there are conditions to comply with the user's request (200).

Figure 10:
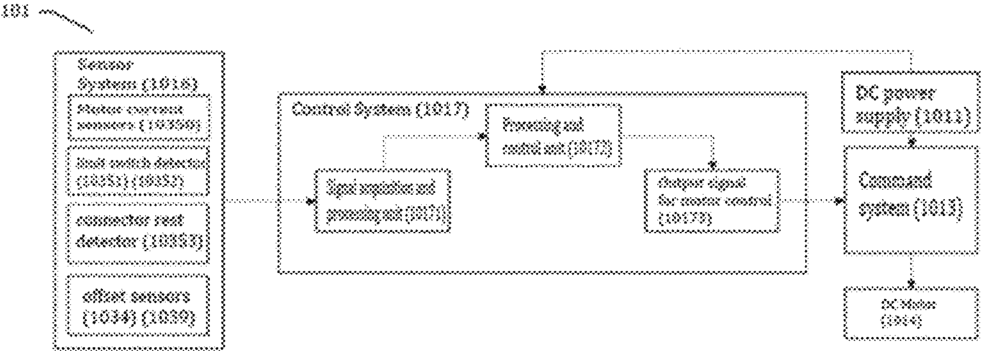
FIG. 10 depicts the diagram of the motorized winding system (101), wherein:
1016—sensor system;
10350—motor current sensors;
10351—limit switch detector/sensor A;
10352—limit switch detector/sensor B;
10353—connector rest detector/sensor;
1034—first offset detector/sensor;
1017—control system;
10171—signal acquisition and processing unit;
10172—processing and control unit;
10173—output signal for motor control;
1011—DC power supply;
1013—command system;
1014—DC motor.

The sensor system (1016), referred to in FIG. 10, is composed of: motor current sensors (10350), which validate whether its operation is taking place within normal operating patterns; limit switch sensors A and B (10351, 10352), which provide information to the motorized winding system (101) on the winding status of the suspension cable (103)

about the reel (1033); first and second offset sensors (1034, 1039), in joint action, allow to validate whether or not there is a suspension cable (103) release request; and rest sensor (10353) of the charging connector (104) on the charging station rest bracket (100), determines the initial and final operating condition of the charging cable management system, so that the motorized winding system (101) dispenses or winds the suspension cable (103).

Figure 11:
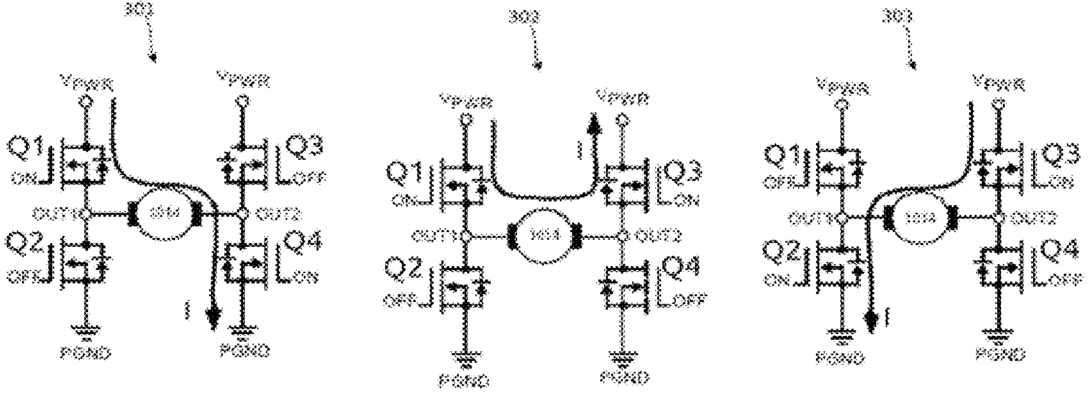
FIG. 11 depicts the electrical component applied to the motor. Reference numbers represent:
301—clockwise rotation movement;
302—immobilized motion.

The way in which the motor (1014) retracts or extends the suspension cable (103), depends on the control signals that close or open the circuits of the electric bridge H where it is inserted, as illustrated in FIG. 11.

First and second offset sensors (1034, 1039), limit switch sensors A and B (10351, 10352) and rest sensor (10353), send the signal with their status to the control unit (1017), which receives them through the signal acquisition unit (10171), the signal processing being performed by the processing unit (10172) which will determine and send the output signal (10173), which will act on the H-bridge of the command system (1013) illustrated in FIG. 11, wherein the motor (1014) promotes the rotation of its axis to one side, closing circuit Q3-Q2 (MOSFET) or to the other, closing circuit Q1-Q4 (MOSFET).

In mechanical terms, the basic concept of the charging cable management system of the present invention involves the use of a model with a motor (1014) associated with a reel (1033), which pulls or releases a weight according to the rotational direction of the motor axis (1014).

In the proposed model, the motor is connected to a rotor (10141), which changes the relationship between speed and torque.

The angular speed in the rotor (10141) decreases in ratio ($W2<W1$) and the torque increases in ratio ($T2>T1$) due to the gear ratio $R=(N2/N1)$. The ratio between rotor (10141), torque and angular speed is as follows:

$$W2=W1/R$$

$$T2=T1\times R$$

Which means that the higher the rotor gear ratio (10141), the higher the torque, the lower the angular speed, in this case the system is able to move a heavier object, yet at a lower speed.

The threaded output shaft (1035) of the rotor (10141) is coupled to a reel (1033), where the suspension cable (103) is wound or unwound.

Considering the particular application of this solution proposed by the present invention in charging electric vehicles, FIG. 13 shows the functional flowchart of the charging cable management system and its conditional operating method.

According to the flowchart shown in FIG. 13, when the motorized winding system (101) detects that the charging connector (104) is not installed on the charging station's rest bracket (100), through information from the rest sensor (10353), the motorized winding system (101) validates the status of the first and second offset detectors (1034, 1039), to assess whether the charging cable (102), and in particular the suspension cable (103), is being pulled by the user (200). If first and second offset detectors (1034, 1039) are triggered, then the motorized winding system (101) will validate whether there is suspension cable (103) to supply or retrieve. This information is determined through the data from the limit switch sensors A and B (10351, 10352). If the availability condition of the suspension cable (103) is verified, the motorized winding system (101) will actuate the rotation movement of the central shaft of the motor (1014), in order to provide (unwind) the suspension cable (103). As long as there is a suspension cable (103) available and it is detected that the charging cable (102) is being pulled and the charging connector (104) is not at rest, the motor shaft (1014) rotates in the rotation direction which promotes the provision of the suspension cable (103).

When the user (200) stops pulling the charging cable (102), there is no longer angling of the suspension cable (103) inside the rail (1031), which leads the first and second offset sensors (1034, 1039) to no longer being activated. Since the contacts of the first and second offset sensors (1034, 1039) are not closed, the motor shaft (1014) will then be immobilized by stopping its rotation. Similarly, when there is no more suspension cable (103) available, the threaded shaft (1035) of the motor (1014) will stop through the contact actuation of the limit switch sensors A and B (10351, 10352).

Then, the motorized winding system (101) validates whether the charging connector (104) is connected to the vehicle for charging the electric vehicle. If the condition is verified, the threaded shaft (1035) of the motor (1014) remains immovable, and there is no need to supply more suspension cable (103).

If the vehicle is not in the charging period, the motorized winding system (101) assesses whether the charging session has already been completed. In the event that the charging connector (104) returns to the resting position, then the charging session is considered to be completed and the motorized winding system (101) proceeds to the phase of validating the presence of suspension cable (103) to retract.

This is carried out by reading the limit switch sensors A and B (10351, 10352) and if there is a suspension cable (103) to retract, the motorized winding system (101) incorporates a timer, which allows the user (200) time to step away so that the system retracts the suspension cable (103) safely.

The suspension cable (103) is retracted, while the charging connector (104) remains in the rest position and there is suspension cable (103) to retract. As soon as the motorized winding system (101) detects, through limit switch sensors A or B (10351, 10352) that the suspension cable (103) is fully wound, then the cycle ends, and the threaded shaft (1035) of the motor (1014) is immobilized.

When the vehicle has finished charging and the rest sensor (10353) placed in the charging connector rest bracket (104) is not activated, a message is sent to the user (200), shown on a display at the charging station (100), requesting him/her to place the charging connector (104) in the resting position on the charging station (100) The system immobilizes the threaded shaft (1035) of the motor (1014) until the charging connector (104) is placed on the rest bracket in the resting position by the user (200).

The motor drive circuit (1014), as illustrated in FIG. 11, is based on an electrical converter with H-bridge configuration. This converter allows driving the motor (1014) clockwise or counterclockwise according to the MOSFET states (Q1, Q2, Q3, Q4), as well as controlling the rotation speed of the motor (1014) using the Pulse-Width Modulation (PWM) technique. To establish the PWM pulse width, a closed loop current control system is used. The reference current used for controlling the motor (1014) is adapted to the weight of the charging cable (102), thus limiting the torque of the motor (1014) to what is essential to move the charging cable (102).

To immobilize the motor (1014) in a given position, a state is induced in transistors such that the poles of the motor (1014) are short-circuited, forcing the existence of a countermovement torque of the rotor, causing the immobilization thereof. This is done by running Q1 and Q3, or else Q2 and Q4.

The present description is of course in no way restricted to the embodiments presented herein and a person of ordinary skill in the art may provide many possibilities of modifying it without departing from the general idea as defined in the claims. The preferred embodiments described above are obviously combinable with each other. The following claims further define preferred embodiments.

The invention claimed is:

1. Electric vehicle charging cable management system, comprising:

a motorized winding system (101) of a suspension cable (103), characterized in that the motorized winding system (101) comprises:

a longitudinal U-shaped rail (1031) with two ends, inside which a guide (1038) comprising a vertical hole passing through its central core runs longitudinally and which is physically and mechanically adapted to the shape of the rail (1031) allowing its free displacement between the two ends, wherein the base of said rail (1031) comprises a longitudinal cutout coincident with the positioning and alignment of the vertical hole of the guide (1038), the rail (1031) comprising at one of its ends a first offset sensor (1034), and at the opposite end a second offset sensor (1039);

a U-shaped bracket (1036) comprising a threaded shaft (1035), a motor (1014) and limit switch sensors A and B (10351, 10352), the threaded shaft (1035) mechanically adapted to the bracket (1036) comprises a movable guide (1037), the motor (1014) mechanically adapted to the threaded shaft in order to promote its rotation is fixed to the bracket (1036), the limit switch sensors A and B (10351,

10352) fixed to the bracket (1036) are positioned so as to determine the positioning of the movable guide (1037), and the rail (1031) is fixed to said bracket (1036);

a reel (1033), positioned above the rail (1031) and mechanically adapted to the threaded shaft (1035) in order to accompany its rotational movements, comprising a mechanical fastening means; and a suspension cable (103) fixed at one of its ends to the reel (1033) by said mechanical fastening means, crosses simultaneously the longitudinal cutout of the rail (1031) and the hole of the guide (1038), comprises at its other end a bracket of the suspension cable (105) mechanically fixed by a clamping system;

wherein the motorized winding system (101) is adapted to control the provision of said suspension cable (103) that guarantees support and suspension of the electric vehicle charging cable.

2. System, according to claim 1, characterized in that the motor (1014) is mechanically adapted to the threaded shaft (1035) by means of a rotor (10141).

3. System, according to claim 1, characterized in that the first and second offset sensors (1034, 1039) detect the contact of the guide (1038) with the respective end of the rail (1031) promoting the activation of the motor (1014).

4. System, according to claim 1, characterized in that the contact of the guide (1038) with the first offset sensor (1034) promotes the rotation of the motor (1014) in one direction, and the contact of the guide (1038) with the second offset sensor (1039) promotes the rotation of the motor (1014) in the same direction corresponding to the unwinding of the suspension cable (103).

5. System, according to claim 1, characterized in that the limit switch sensors A and B (10351, 10352) detect the contact of the movable guide (1037) that runs along the threaded shaft (1035) with the ends of the bracket (1036).

6. System, according to claim 1, characterized in that the reel (1033) promotes the winding or unwinding of the suspension cable (103) through the action generated by the motor (1014).

7. System, according to claim 1, characterized in that the contact of the movable guide (1037) with the limit switch sensor A (10351) or with the limit switch sensor B (10352) identifies the winding or unwinding position of the cable (103) on the reel (1033).

8. System, according to claim 1, characterized in that it comprises an outer housing (1032) with an open groove at its base that allows the suspension cable (103) to pass through and be handled.

9. System, according to claim 1, comprising:

a control system (1017) consisting of a signal acquisition and processing unit (10171), a processing and control unit (10172) and an output signal for motor control (10173);

a command system (1013); and a DC power supply (1011).

10. System, according to claim 1, characterized in that it comprises a sensor system (1016) composed of motor current sensors (10350) and connector rest sensors (10353).

11. System, according to claim 1, characterized in that the control system (1017) receives signals from the sensor system (1016) through the signal acquisition unit (10171), performing signal processing in the processing unit (10172) which sends the output signal (10173) to the command system (1013) of the motor (1014).

12. System, according to claim 1, characterized in that the output signal (10173) actuates the command system (1013) through the use of an H-bridge, which promotes the rotation of the motor (1014) in a direction, thus closing a MOSFET circuit Q3-Q2, or promotes rotation of the motor (1014) in the reverse direction thus closing a MOSFET circuit Q1-Q4.

13. Electric vehicle charging system (100) comprising:

at least one electric vehicle charging cable management system as described in claim 1, and at least one charging cable (102) with a charging connector (104);

wherein the charging cable (102) is supported by the suspension cable (103) of the motorized winding system (101) ensuring that it does not come into contact with the ground when not in use.

* * * * *